No. 794,286. PATENTED JULY 11, 1905.
J. E. ERICKSON.
SELF FEED FOR BOX TRIMMING MACHINES.
APPLICATION FILED FEB. 4, 1905.

4 SHEETS—SHEET 1.

Witnesses
Theo. Lagaard.
H. A. Bowman.

Inventor
John E. Erickson
By P. H. Gunckel
his Attorney.

No. 794,286. PATENTED JULY 11, 1905.
J. E. ERICKSON.
SELF FEED FOR BOX TRIMMING MACHINES.
APPLICATION FILED FEB. 4, 1905.

4 SHEETS—SHEET 2.

Witnesses
Theo. Lagaard.
H. A. Bowman.

Inventor
John E. Erickson
By P. H. Gunckel
his Attorney.

No. 794,286. PATENTED JULY 11, 1905.
J. E. ERICKSON.
SELF FEED FOR BOX TRIMMING MACHINES.
APPLICATION FILED FEB. 4, 1905.

4 SHEETS—SHEET 3.

Witnesses
Theo Laymard
H. A. Bowman.

Inventor
John E. Erickson
By P. H. Gunckel
his Attorney.

No. 794,286. PATENTED JULY 11, 1905.
J. E. ERICKSON.
SELF FEED FOR BOX TRIMMING MACHINES.
APPLICATION FILED FEB. 4, 1905.
4 SHEETS—SHEET 4.
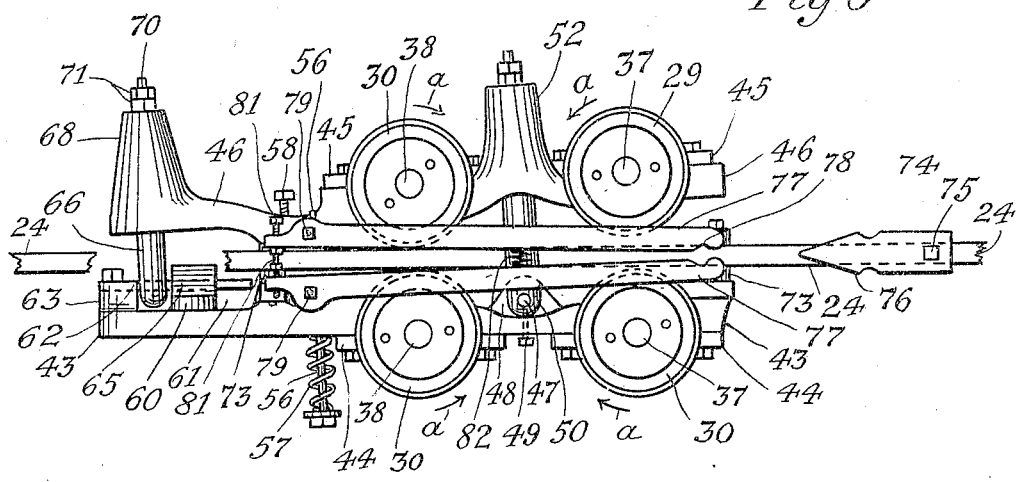
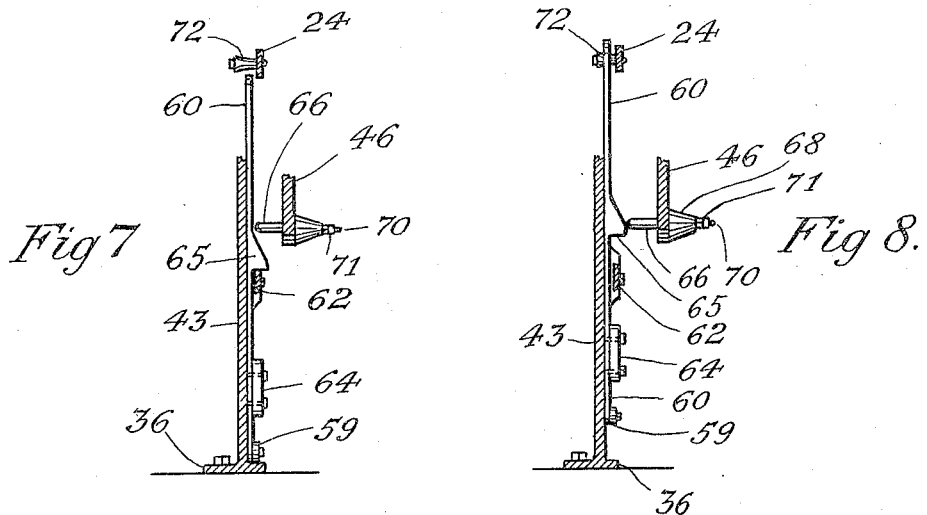
Witnesses
Theo. Lagaard
H. O. Bowman
Inventor
John E. Erickson.
By P. H. Gunckel
his Attorney No. 794,286. Patented July 11, 1905.

UNITED STATES PATENT OFFICE.

JOHN E. ERICKSON, OF ST. PAUL, MINNESOTA, ASSIGNOR OF ELEVEN-SIXTEENTHS TO HAROLD J. LOHRBAUER, WALTER B. KELLEY, AND JOHANNES LOHRBAUER, OF ST. PAUL, MINNESOTA.

SELF-FEED FOR BOX-TRIMMING MACHINES.

SPECIFICATION forming part of Letters Patent No. 794,286, dated July 11, 1905.

Application filed February 4, 1905. Serial No. 244,096.

*To all whom it may concern:*

Be it known that I, JOHN E. ERICKSON, a citizen of the United States, residing at St. Paul, in the county of Ramsey and State of Minnesota, have invented certain new and useful Improvements in Self-Feeds for Box-Trimming Machines, of which the following is a specification.

My invention relates to devices for moving the boxes to and past the saws in box-trimming machines; and its principal object is to lessen the manual labor of trimming a box by providing mechanical devices adapted to properly feed the box to the saws and return the box-carrier to initial position.

My improvement is especially applicable to machines of the type set forth in my Patent No. 675,940 of June 11, 1901.

Figure 1:
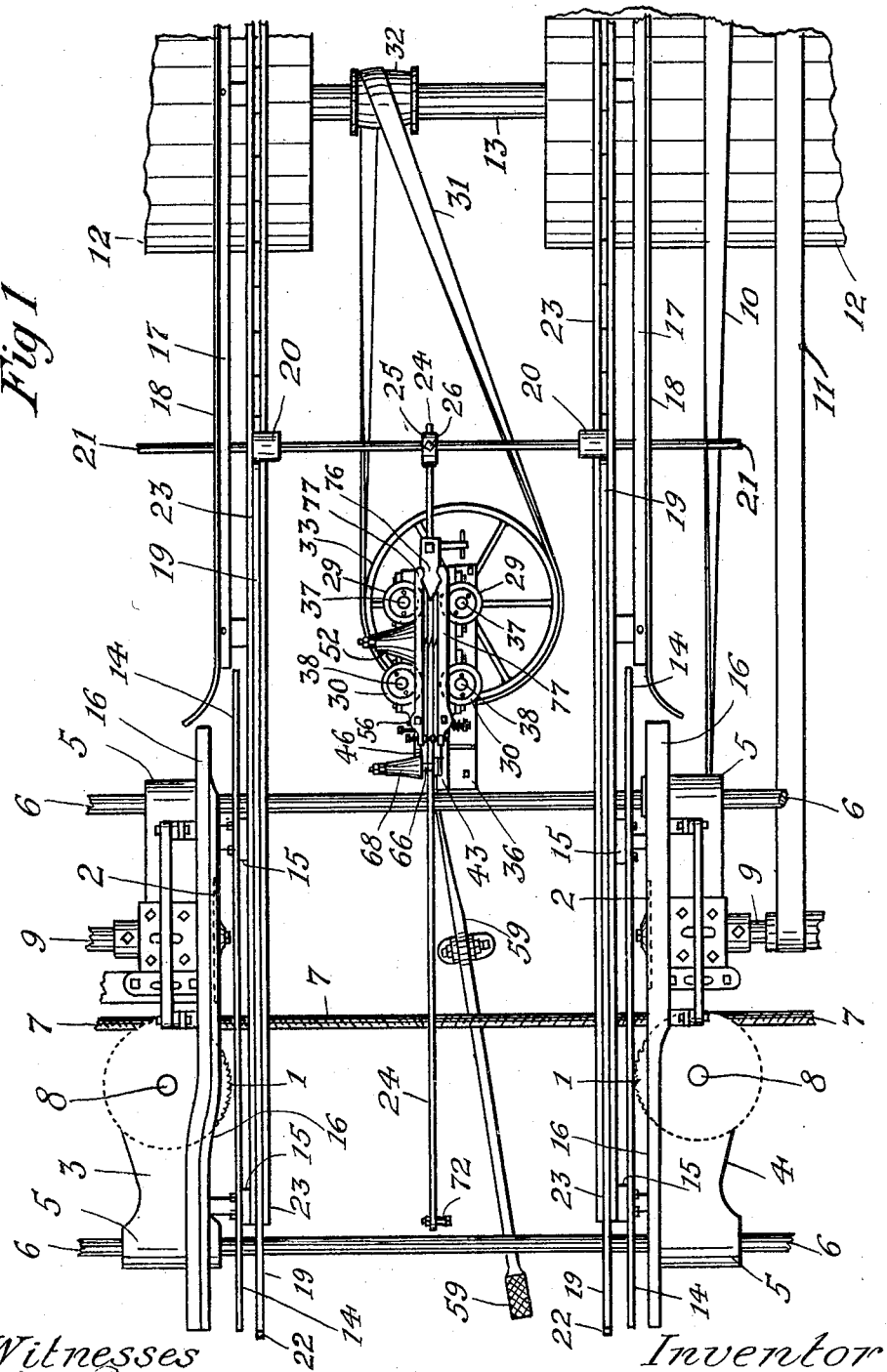
Figure 2:
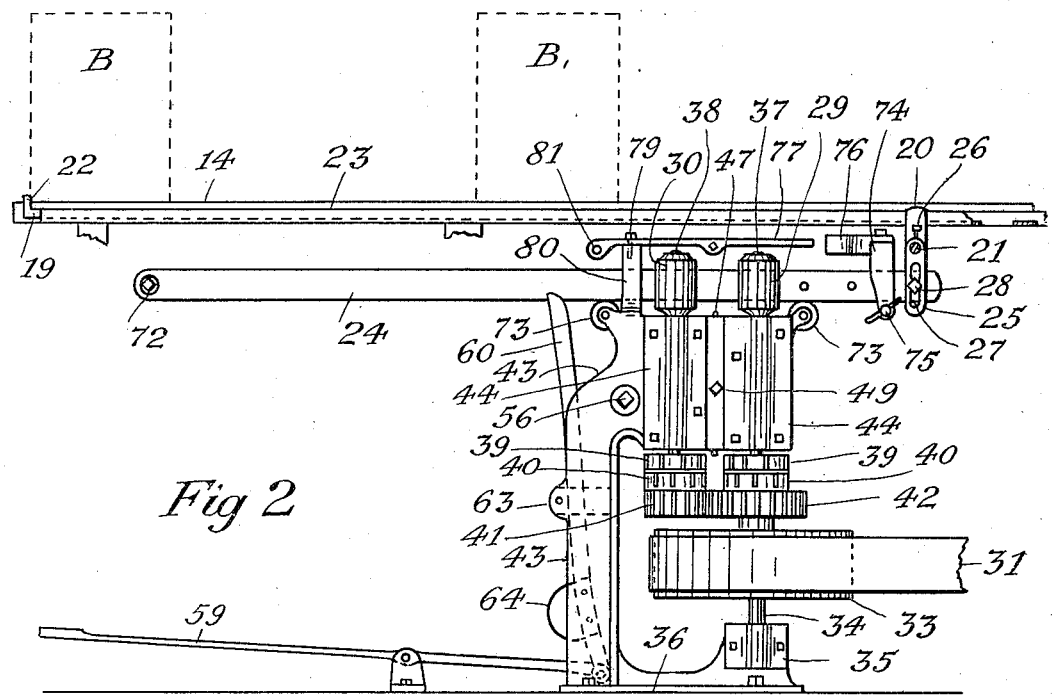
Figure 3:
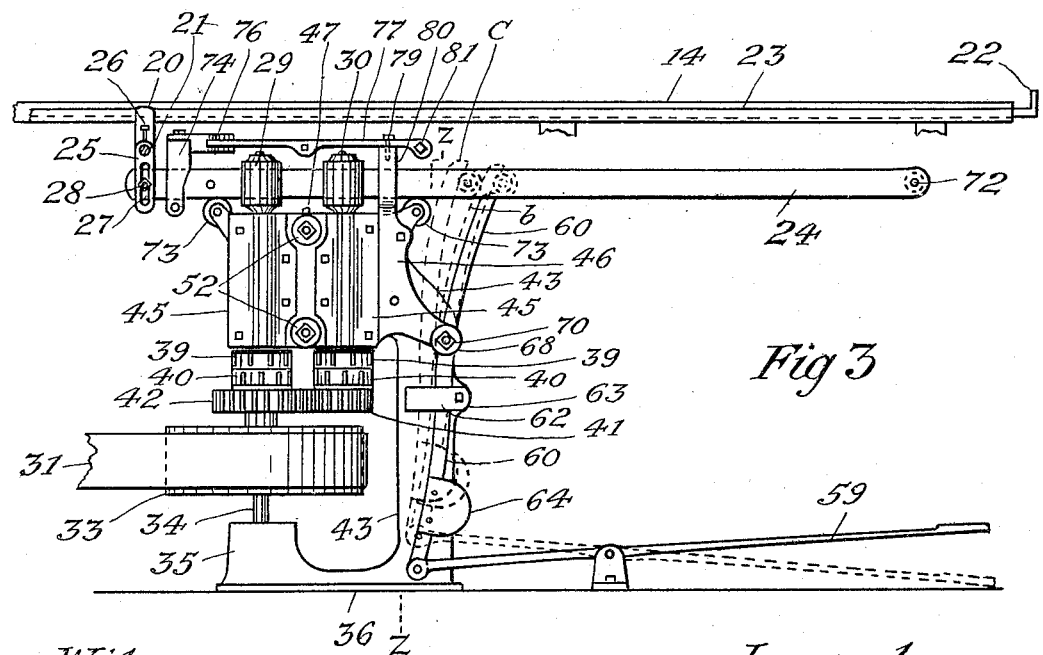
Figure 4:
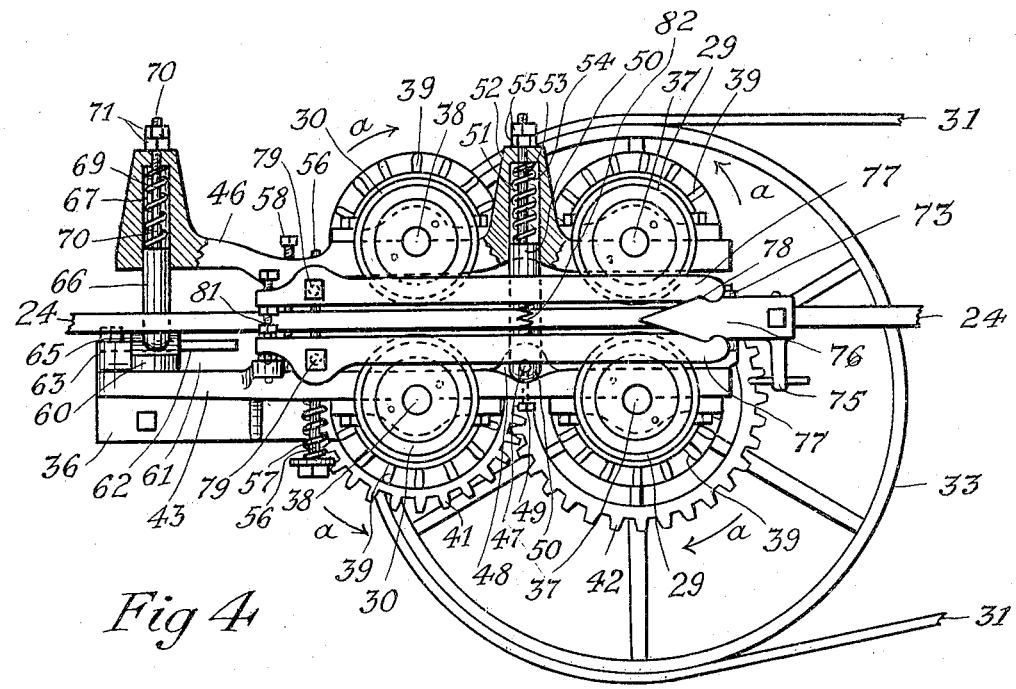
Figure 5:
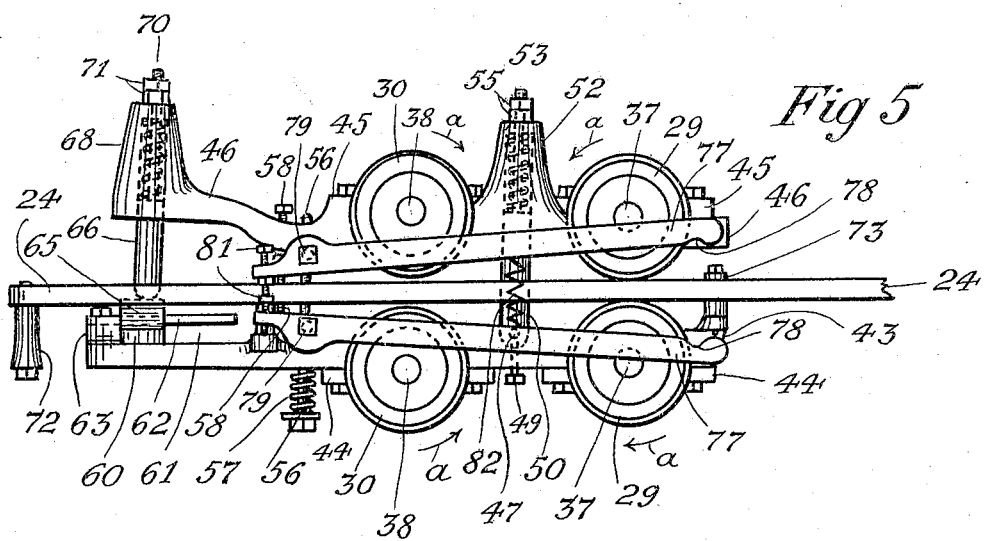

In the accompanying drawings, illustrating my improvements, Figure 1 is a plan view of a portion of a box-trimming machine of the type shown in my previous patent with the automatic feed devices of my present improvement added. Figs. 2 and 3 are side elevations of the box-feed devices viewed, respectively, from opposite sides of the machine. Fig. 4 is a plan view, enlarged from Fig. 1 and partly in section, of the mechanism for actuating the feed-carriage and showing the relative positions of its members when the carriage is at rest or in initial position. Fig. 5 is a plan view showing in detail the friction feed-rollers and immediate connections in the positions they occupy while the carriage is being advanced. Fig. 6 is a similar view showing the relative positions of the same parts during the retraction of the feed-carriage, and Figs. 7 and 8 show in vertical section on the plane of the broken line *z z* of Fig. 3 detail views of the foot-lever and devices directly actuated by it for causing the box-carrier to be advanced.

Only so much of the trimming-machine is illustrated as was deemed necessary to show the connection of the feed devices with a machine of the type referred to.

The machine shown employs two pairs of saws, a pair of opposite horizontal saws 1 and a pair of opposite vertical saws 2, mounted and operated in carriages 3 and 4, and these carriages have sleeves 5, that are slidable on transverse rods 6 to enable the opposite saws to be moved by means of an oppositely-threaded screw 7 (or by other means) toward or away from each other, as may be required to properly adjust them to operate upon boxes of different sizes. The saw-arbors 8 and 9 are driven, respectively, by belts 10 and 11 from pulleys 12 on the main driving-shaft 13. The bed or track on which the box moves while it is being carried past the saws consists of a pair of bars 14, extending from the head of the machine rearward beyond the saws and supported on brackets 15 from the saw-carriages 3 and 4. To guide the sides of the box during the trimming operation, suitable guide-strips 16 are mounted on the frames of the saw-carriages. Supports or tracks for the boxes after they have passed beyond the tracks 14 are provided by horizontally-arranged plates 17, and vertically-arranged side strips 18 along their outer edges guide the boxes rearward.

The box-carrier consists of a skeleton frame comprising two longitudinal bars 19, connected by hangers 20 to a cross-rod 21. The front ends of the bars are provided with knees or projections 22 for engaging the outer side of a box and carrying it along over the tracks 14 when the bars 19 are moved inward. Ways or guides 23, in which these bars slide, are supported by the brackets 15 and are laterally adjustable, along with the tracks 14, by the inward or outward adjustment of the saw-carriages 3 and 4. The box-carrier is reciprocated by means of a feeding-bar 24, connected to the cross-rod 21. This connection is preferably made by the use of a forked hanger 25, secured to the rod by a set-screw 26 and having vertical slots 27 in its side walls and a bolt 28 to enable the guideways 23 to be adjusted up or down relative to the saws without affecting the horizontal position of the feeding-bar 24. The feeding movement of the bar 24 is effected by the frictional contact therewith of a pair of suitable coöperating friction-rollers 29 and its retraction by a similar pair of rollers 30, the arrangement of the operating mechanism being such that only one pair of the rollers is in frictional contact with the bar during its advance or return movement and both pairs are out of contact with the bar while it is in normal position and until an operator moves the rollers 29 to contact with it. The friction-rollers 29 and 30 are driven from the main shaft by a belt 31, connecting a pulley 32 thereon with a pulley 33 on a spindle 34 in a step-box 35, provided on a fixed base 36. The arbors 37 and 38 of the rollers 29 and 30 carry near their lower ends intermeshing spur-wheels 39 and 40, adapted and arranged to continue in operative contact during the necessary slight lateral adjusting movements of the arbors, and on the lower end of one of the arbors 40 is a gear-wheel 41, in mesh with a corresponding gear 42 on the spindle 34. The rotation of the latter spindle will obviously cause the spur-wheels 39 and 40 to continuously rotate the rollers 29 and 30 in the required opposite directions, (indicated by the arrows $a$.) These parts are mounted on a standard or upright frame 43, supported by the base 36.

Journal-boxes 44 for the arbors 37 and 38 at one side of the feeding-bar 24 are rigidly secured to the corresponding side of the standard 43, while the boxes 45 for the other two arbors are provided on a separate plate 46, arranged at the opposite side of the bar 24 and pivotally connected or hinged to the standard. This connection is made by means of a vertical rod or pintle 47, passed through inward lugs 48 on the standard 43 and held in place by a set-screw 49, and upper and lower hinging-bars 50 extend from the plate 46 to the pintle and are pivotally connected thereto. These bars 50 are slidable in sockets 51 in bosses 52, formed on the plate 46, and have narrowed portions 53, around which are coil-springs 54, the pressure of which tends to move the plate 46 laterally and away from the standard 43. The protruding ends of the parts 53 are screw-threaded to receive nuts 55 for regulating the pressure of the springs 54. The plate 46 is further connected to the standard by a bolt 56, the thread of which is screwed into the plate. The shank passes loosely through a hole in the standard, and a coil-spring 57, inserted between the standard and bolt-head and connected thereto, tends to draw the plate toward the standard. An adjustable stop to prevent the plate 46 from being moved farther than desired toward the standard is provided by a set-screw 58, which is screwed through the plate, with its shank projecting inward toward the standard. It will therefore be understood that by the means described the plate 46 is capable of oscillatory movement with reference to the stationary standard on the rod 47, that the springs 54 tend to move it outward, that the spring 57 tends to pull it inward, and that the stop 58 serves in a measure to limit such movements.

In idle condition the feeding-bar 24 is free from contact with the friction-rollers 29 and 30, as shown in Figs. 1 and 4, and to then engage it between the proper pair of rollers 29, as shown in Fig. 5, to feed it inward requires the operation of the foot-lever 59. This lever has pivotally connected to its inner end an upwardly-extending lever-arm 60, that passes loosely through a retaining-slot 61, formed between the wall of the standard 43 and a plate 62, bolted to a projection 63 thereon, and the arm is weighted, as at 64, to cause it to gravitate outward to the limit of the slot when in its normal position. On one side of the arm 60 is a lug 65, having an inclined surface in position to engage the end of a pin 66, which extends from the plate 46 toward the standard 43, and the upward movement of the incline pushes the pin and the plate carrying it outward, and thereby turns the plate on its pintle or hinge 47, which movement brings the pair of friction-rollers at the opposite end of the plate to operative contact with the bar 24. The positions of the lever-arm and the parts it directly actuates are shown in the detail views Figs. 7 and 8 and also by the full lines and the broken lines $b$ nearest them in Fig. 3. It is preferable that the pin 66 be yieldingly supported, and it is therefore made slidable in a socket 67 in a boss 68 against the pressure of a spring 69, the narrow shank 70 of the pin projecting through the head of the boss and being threaded to receive nuts 71 for regulating the spring-pressure. While the lever-arm 60 remains in the elevated position just referred to the bar 24 will be carried along by the action of the rollers 29 until a projection or trip 72 on the bar engages the upper end of the lever-arm and throws it over to the position indicated by the broken lines $c$ in Fig. 3. Such movement disengages the lug 65 from the pin 66, and thus permits the spring 57 to draw the corresponding portion of the plate 46 toward the standard, turning it on its pintle 47, and thereby bringing the friction-rollers 30 into engagement with the feed-bar while freeing the rollers 29 from such contact. This change of frictional engagement will obviously cause the feed-bar first to stop and then to begin its return movement. The feed-bar rides on antifriction-rollers 73, mounted on the standard 43. For the purpose of utilizing the return movement of this bar to separate the rollers 30 at the proper time it carries on its inner portion a forked stopping device 74, that is held and adjusted on the bar by a set-screw 75. The stop has a pointed head 76, recessed at the sides, of somewhat arrow-head form, designed to enter between and be held by the longer arms of a pair of levers 77. The ends of the lever-arms are suitably rounded to permit the point of the stop-head to enter freely and are recessed, as at 78, to engage the shoulders of the head and hold it from accidental movement. These levers 77 are fulcrumed at 79 on the tops of two posts 80, which are respectively upward extensions of the standard 43 and the plate 46. Each of the shorter lever-arms is provided with a set-screw 81, so arranged that the point of one screw is in constant contact with the head of the other. A spring 82 connects the longer arms and tends to press them apart, as indicated in Fig. 5, which shows the relative positions of parts while the foot-lever is performing its function of holding the lug 65 against the pin 66 to cause the bar 24 to be fed onward by the rollers 29; but when the lug 65 is moved from contact with the pin 66 by the trip 72 and the spring 57 draws the plate 46 from the position shown in Fig. 5 to that shown in Fig. 6 the levers 77 will be moved from their positions in the former to those shown in the latter figure, because the fulcrum of the lever carried by the moving plate is moved toward the other fulcrum, while the contact of the screws 81 prevents inward movement of the shorter lever-arms, thus necessitating approaching movements of the longer arms. The levers 77 then being in approximately the positions shown in Fig. 6 while the feed-bar is being retracted, when the stop-head 76 enters between their ends it forces them apart, as indicated in Fig. 4, and thereby moves the fulcrum 79 of the lever mounted on the plate 46, and with it the plate itself, which movement causes a sufficient separation of the friction-rollers 30 to force them from the feed-bar. Thus the bar is stopped and remains at rest until the foot-lever 59 is again pressed down by the operator.

In use the operator after placing a box (shown by the broken lines B) on the carriage presses down the foot-lever, and thereby swings the plate 46 on its pivot, causing the rollers 29 to grip the bar 24 and advance the carriage past the saws and until the trip 72 trips the lever-arm 60. Thereupon the spring 57 is permitted to swing the plate 46 so as to separate the rollers 29 and cause the rollers 30 to engage the feed-bar and retract it, leaving the box resting on the table-bars 14 in about the position indicated by the broken lines B'. When the carriage has been returned to its initial position, the stop-head 76 will have pressed apart the levers 77 and the rollers 30 and the carriage will be at rest. The box in the position shown by B' is within convenient reach of the operator, so that he can replace it at the head of the carriage to repeat the operation for trimming its untrimmed edges, if required. When all of its edges have been trimmed, the box may be allowed to remain in the position shown by B', to be pushed toward the rear of the machine on the table members 17 by the next box that is fed along by the carriage, and so each successive box fed along may serve to move rearward the finished boxes on the table.

Having described my invention, what I claim, and desire to secure by Letters Patent, is—

1. In a box-trimming machine, in combination, a box-carriage, a feed-bar therefor, pairs of coöperating friction-rollers, rotating in opposite directions, and means for causing alternate engagement of said bar by said rollers to advance and retract the carriage, substantially as set forth.

2. In a box-trimming machine, in combination, a box-carriage, a feed-bar therefor, pairs of coöperating friction-rollers, rotating in opposite directions, controllable means for causing engagement of the bar by one pair of rollers to advance the carriage, and automatic means for causing engagement of the bar by the other pair of rollers to retract the carriage, substantially as set forth.

3. In a box-trimming machine, in combination, a box-carriage, a feed-bar therefor, pairs of coöperating friction-rollers, rotating in opposite directions, a movable support for one of the rollers of each pair, and means for moving such support for causing alternate engagement of said bar by said rollers to advance and retract the carriage, substantially as set forth.

4. In a box-trimming machine, in combination, a box-carriage, a feed-bar therefor, pairs of coöperating friction-rollers, rotating in opposite directions, a support for one of the rollers of each pair pivoted intermediate the pairs, and means for swinging such support on its hinge to cause alternate engagement of said bar by said rollers to advance and retract the carriage, substantially as set forth.

5. In a box-trimming machine, in combination, a box-carriage, a feed-bar therefor, pairs of coöperating friction-rollers, rotating in opposite directions, a support for one of the rollers of each pair pivoted intermediate the pairs, controllable means for swinging such support on its hinge to cause one pair of the rollers to engage the bar to advance it, and automatically-operating means for swinging such support on its hinge to cause the other pair of rollers to engage the bar to retract it, substantially as set forth.

6. In a box-trimming machine, in combination, a box-carriage, a feed-bar therefor, pairs of coöperating friction-rollers, rotating in opposite directions, controllable means for causing engagement of the bar by one pair of rollers to advance the carriage, means operating automatically for causing engagement of the bar by the other pair of rollers to retract the carriage, and means operating automat- 7. In a box-trimming machine, the combination with oppositely-arranged saws and intermediate box supporting and guiding devices, of a box-carriage, a feed-bar connected thereto, a pair of friction-rollers for engaging such bar to advance it, a second pair of friction-rollers rotating in opposite direction for engaging the bar to retract it, means for causing the proper alternate engagement of the bar by the rollers, and means for releasing the bar from the engagement of either pair of rollers upon retraction of the bar to initial position, substantially as set forth.

8. In a box-trimming machine, the combination with oppositely-arranged saws and intermediate box supporting and guiding devices, of a box-carriage, a feed-bar connected thereto, a pair of friction-rollers for engaging such bar to advance it, a second pair of friction-rollers rotating in opposite direction for engaging the bar to retract it, a fixed support on which one roller of each pair is mounted, a second support hinged to the fixed support for mounting the other two rollers, and means for swinging the latter support on its hinge to cause alternate engagement of the feed-bar by the pairs of rollers to advance and retract the box-carriage, substantially as set forth.

9. In a box-trimming machine, the combination with oppositely-arranged saws and intermediate box supporting and guiding devices, of a box-carriage, a feed-bar connected thereto, a pair of friction-rollers for engaging such bar to advance it, a second pair of friction-rollers rotating in opposite direction for engaging the bar to retract it, a fixed support on which one roller of each pair is mounted, a second support hinged on the fixed support for mounting the other two rollers, means under control of an operator for swinging the hinged support to cause one pair of rollers to advance the bar, and automatically-operating means for causing the other pair of rollers to retract the bar to initial position, substantially as set forth.

10. In a box-trimming machine, the combination with oppositely-arranged saws and intermediate box supporting and guiding devices, of a box-carriage, a feed-bar connected thereto, a pair of friction-rollers for engaging such bar to advance it, a second pair of friction-rollers rotating in opposite direction for engaging the bar to retract it, a fixed support on which one roller of each pair is mounted, a second support hinged on the fixed support for mounting the other two rollers, a spring tending to swing the hinged support in one direction and a controllable lever for swinging it in opposite direction to cause alternate contact of the pairs of rollers with the bar, and a trip carried by said bar for rendering the lever inoperative at the proper time to permit the spring tension to reverse the friction-roller engagement, substantially as set forth.

In testimony whereof I have signed my name to this specification, in the presence of two subscribing witnesses, this 20th day of January, 1905.

JOHN E. ERICKSON.

Witnesses:
P. H. GUNCKEL,
H. A. BOWMAN.